United States Patent
Hein et al.

(10) Patent No.: US 9,441,705 B2
(45) Date of Patent: Sep. 13, 2016

(54) HOLDER FOR FASTENING A UNIT, IN PARTICULAR A PUMP, TO A MOTOR VEHICLE

(75) Inventors: Bernd Hein, Baiersbronn/Schoenmuenzach (DE); Guenther Riehl, Buehl (DE); Samir Mahfoudh, Buehl (DE); Thomas Kotlarski, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/355,976

(22) PCT Filed: Sep. 3, 2012

(86) PCT No.: PCT/EP2012/067051
§ 371 (c)(1),
(2), (4) Date: May 2, 2014

(87) PCT Pub. No.: WO2013/064282
PCT Pub. Date: May 10, 2013

(65) Prior Publication Data
US 2014/0299735 A1  Oct. 9, 2014

(30) Foreign Application Priority Data
Nov. 2, 2011 (DE) .......... 10 2011 085 558

(51) Int. Cl.
*F16F 15/04* (2006.01)
*F16M 1/021* (2006.01)
(Continued)

(52) U.S. Cl.
CPC .............. *F16F 15/04* (2013.01); *F16F 1/371* (2013.01); *F16F 1/3732* (2013.01); *F16M 1/021* (2013.01); *F16M 1/04* (2013.01); *H02K 5/225* (2013.01); *H02K 5/24* (2013.01); *F16M 1/00* (2013.01)

(58) Field of Classification Search
CPC ........ F16M 13/00; F16M 1/00; F16M 1/021; F16M 1/08; F16M 1/04; F16M 1/025; F16M 1/026; H02K 5/24; H02K 5/16; H02K 5/04; H02K 5/225; F16F 15/04; F16F 1/371; F16F 1/3732
USPC ....... 248/674, 300, 903, 603, 604, 659, 675; 417/360, 313, 423.15, 361
See application file for complete search history.

(56) References Cited

U.S. PATENT DOCUMENTS 3,129,914 A * 4/1964 Wedge ................ 248/665
5,566,919 A * 10/1996 Shephard ............. 248/604
(Continued)

FOREIGN PATENT DOCUMENTS

DE   102009029067   3/2011
EP   0124069   11/1984
(Continued)

OTHER PUBLICATIONS

International Search Report for Application No. PCT/EP2012/067051 dated Dec. 6, 2012 (2 pages).

*Primary Examiner* — Nkeisha Smith
(74) *Attorney, Agent, or Firm* — Michael Best & Friedrich LLP

(57) ABSTRACT

In the case of a holder for fastening a unit (2), in particular a pump, to a motor vehicle, with an annular damping element (1), the inner region of which is provided for accommodating the unit (2) and which has, on the outside, a block-shaped fastening part (4), under the upper side (14) of which a plate-like insert (8) which is designed for local reinforcement of the damping element (1) is arranged, it is proposed according to the invention that two opposite edges of the insert (8) each have a wing (11) running into the damping element (1). This produces an increased, but limited local minimum rigidity of the holder.

13 Claims, 4 Drawing Sheets

(51) Int. Cl.
*F16M 1/04* (2006.01)
*F16F 1/371* (2006.01)
*F16F 1/373* (2006.01)
*H02K 5/24* (2006.01)
*H02K 5/22* (2006.01)
*F16M 1/00* (2006.01)

(56) References Cited

U.S. PATENT DOCUMENTS

| | | | | |
|---|---|---|---|---|
| 5,696,360 | A * | 12/1997 | Tiemeyer | 181/205 |
| 5,799,918 | A * | 9/1998 | Swinderman et al. | 248/300 |
| 5,881,992 | A * | 3/1999 | Evertowski et al. | 248/674 |
| 7,157,817 | B2 * | 1/2007 | Hvidberg | 310/51 |
| 2005/0023912 | A1 * | 2/2005 | Lin et al. | 310/89 |
| 2007/0035073 | A1 * | 2/2007 | Kinmartin et al. | 267/136 |
| 2007/0222310 | A1 * | 9/2007 | Drexlmaier | 310/51 |
| 2009/0189052 | A1 * | 7/2009 | Naji et al. | 248/672 |
| 2009/0315235 | A1 | 12/2009 | Rodecker | |
| 2010/0032544 | A1 | 2/2010 | Tsakiris | |
| 2012/0012731 | A1 * | 1/2012 | Johnson | 248/638 |
| 2012/0273648 | A1 * | 11/2012 | Maske et al. | 248/636 |
| 2014/0009011 | A1 * | 1/2014 | Uchida et al. | 310/51 |
| 2014/0125160 | A1 * | 5/2014 | Nara et al. | 310/51 |

FOREIGN PATENT DOCUMENTS

| | | |
|---|---|---|
| GB | 2030377 | 4/1980 |
| JP | 50-122309 | 10/1975 |
| JP | H04316729 | 11/1992 |
| JP | H05248466 | 9/1993 |
| JP | H06185558 | 7/1994 |
| JP | H08-4816 | 1/1996 |
| JP | H0814329 | 1/1996 |
| JP | 2001090761 | 4/2001 |
| JP | 2004036636 | 2/2004 |
| JP | 2009255888 | 11/2009 |
| JP | 2011027203 | 2/2011 |

* cited by examiner

HOLDER FOR FASTENING A UNIT, IN PARTICULAR A PUMP, TO A MOTOR VEHICLE

BACKGROUND OF THE INVENTION

The invention relates to a retention member for securing a unit, in particular a pump, to a motor vehicle. The retention member has an annular damping element whose inner region is provided for receiving the unit. At the outer side, the damping element has a block-like securing element whose upper side which is directed radially away from the center of the damping element is provided as an interface to the motor vehicle, there being arranged in the securing element, below the upper side, a substantially plate-like insertion member which is configured to locally reinforce the damping element.

Retention members of this type are already commercially available.

In the construction and configuration of system components, such as, for example, a cooling circulation pump for a motor vehicle, the dynamic loads which are to be anticipated during operation of the motor vehicle, in particular the components of the system components, such as printed circuit boards and pin connections, are a challenge for developers with respect to durability. Often the high specification requirements, the narrow structural spaces and the cost pressures lead to undersizing of critical components, which may lead to failure of an individual component and consequently also the unit.

An example of this in this instance involves requirements for the vibration-resistance of the unit when fitted to an internal combustion engine of the motor vehicle. The resulting dynamic loads of the products often far exceed the permissible load-resistance. Missing or inadequate material damping systems often bring about, in the case of vibration loads, critical resonance frequencies with the excitation being exceeded by up to 20 times and consequently significantly limit the desired service-life of the product. In this instance, the transmission intensity of the oscillation energy of the oscillation exciter, that is to say, the internal combustion engine, on the product secured thereto, as far as the individual components, is highly dependent on the connection type of the components and the material dampings thereof. A rigid retention of the pump on the engine means undamped transmission of the excitation energy to the pump and consequently an excessively high loading of the pump, or the individual components thereof.

The service-life of a product is inversely proportional to its loads, the stresses being able to be decisively minimized by means of a damping. For a resilient retention system, highly-damping elastomer buffers are suitable, for example, comprising EPDM (ethylene propylene diene monomer rubber) which absorb the oscillation energy and convert it into internal friction; heat which the elastomer material discharges outwards is produced.

In known retention members, the damping element is typically mounted as an annular retention member/decoupling element between the unit and the oscillation exciter, cf., for example, DE 10 2009 029 067 A1. This is an efficient solution with respect to damping but, as a result of the low level of rigidity of the elastomer retention member, brings about undesirably great occurrences of deflection of the unit (in particular in the low frequency range) and can lead to a collision with adjacent components. Furthermore, an excessively resilient retention member, for example, as a result of the assembly forces which occur when the connector is mounted on the pump, can lead to occurrences of expansion or displacement of the pump, which make subsequent assembly of the pump more difficult. In order to eliminate the danger of the unit being shaken loose from the elastomer retention member, an additional annular retention sheet is often also required.

During the configuration of an elastomer retention member, therefore, it should be ensured that, at one side, a minimum damping for decoupling the pump has to be present and, at the other side, a maximum deflection (dependent on the structural space and assembly conditions) must not be exceeded. In principle, this can be achieved, for example, by means of a suitable Shore hardness of the elastomer mixture or by means of an insertion member for reinforcing the elastomer retention member, preferably of steel or thermosetting material.

SUMMARY OF THE INVENTION

An object of the invention is to provide an improved retention member for securing a unit in a motor vehicle. In this instance, in addition to the mechanical decoupling between the internal combustion engine and the pump, the ease of assembly for other units on the pump, such as, for example, an electrical connector, is intended to be promoted by increased rigidity.

In the retention member according to the invention, the insertion member has at each of the two opposing edges a wing which is preferably narrow and which preferably extends in an oblique manner into the damping element. The notion forming the basis of the invention is to reinforce the rigidity of the elastomer retention member in a selective, location-dependent manner, by increasing or extending the insertion member, but with appropriate geometric construction of the additional insertion member faces as narrow wings, on the one hand, to make optimum use of the available structural space and, on the other hand, to avoid excessive coverage of the elastomer material, which would impair the damping function. The extension of the insertion member with wings further improves the anchoring of the insertion member in the elastomer so that significant relative movements are no longer possible and consequently no cracks occur in the elastomer material.

According to a first development of the invention, the wings are arranged approximately centrally at the edges, in particular at the longitudinal sides, of the insertion member so that the wings are embedded at the most central location possible in the elastomer material and may optionally become even further deformed in the elastomer during assembly operations.

According to an advantageous development of the invention, the configuration of a local minimum rigidity of the damping element as required in the respective application, which rigidity ensures a compromise with the required damping, can be implemented by means of selection of the material, the cross-section and the length of the wings.

In another development of the invention which is considered to be particularly advantageous with respect to the bonding between the insertion member and the damping element and in which the damping element comprises an elastomer material, in which the insertion member is enclosed by means of vulcanization, the ends of the wings each have a hole for positive-locking connection to the elastomer material.

BRIEF DESCRIPTION OF THE DRAWINGS

The invention is described in greater detail below with reference to embodiments, in which.

DETAILED DESCRIPTION

Figure 1:
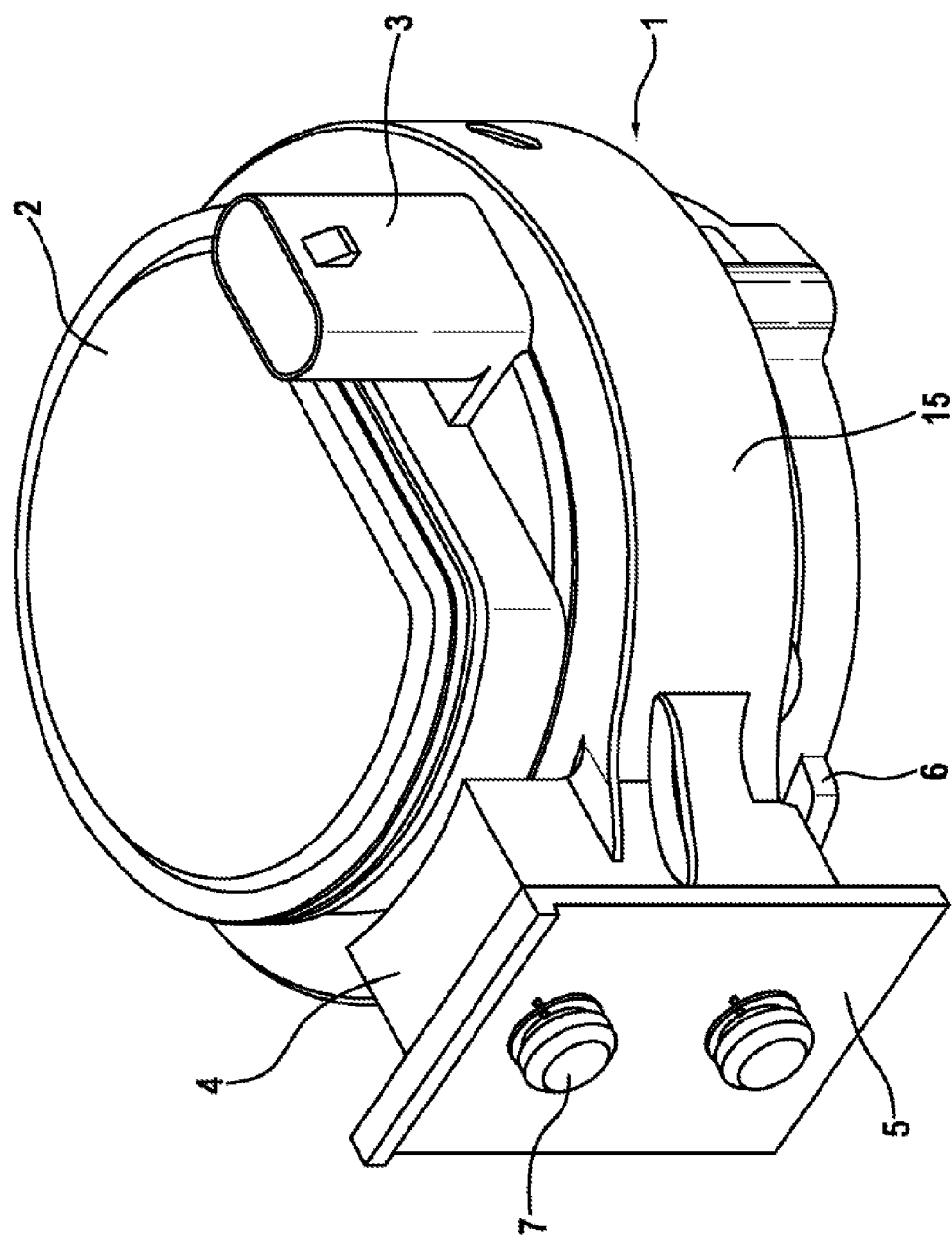
FIG. 1 is a perspective view of a retention member according to the invention which is not yet mounted on the motor vehicle and which has a pump.

FIG. 1 is a schematic illustration of a retention member having an annular damping element 1 into the inner space of which a cooling circulation pump 2 is pressed. The pump 2 is provided with a connector 3 for the electrical connection. A region of the periphery of the damping element 1 is constructed as a securing element 4 which is reinforced in a block-like manner and which has an upper side 14 (covered in this instance) which faces towards the customer interface 5 (for example, engine mounting). In addition, the damping element 1 has an annular portion 15 which surrounds the pump 2. Support ribs 6 may be provided in order to mechanically stabilize the securing element 4 which is integrally connected to the damping element 1, as can be seen in FIG. 1 and the other Figures. Two connection bolts 7 which are provided in order to produce a screw connection to the engine mounting 5 are anchored in the material of the damping element 1 or the securing element 4.

In order to produce in the region of the securing element 4 a selective rigidity in order to reduce the deflection of the elastomer retention member in the case of subsequent assembly (connection) of the connector 3, a plate-like insertion member which cannot be seen is embedded in the securing element 4, for example, by means of insertion of such an insertion member in an elastomer injection tool and subsequent vulcanization. For better understanding, in the illustration according to FIG. 2, which shows the annular damping element 1 still without a pump 2, the insertion member 8, as it is embedded in the securing element 4 in FIG. 1, is illustrated above the upper side 14 of the securing element 4. The first variant of the insertion member 8 illustrated preferably has a U-shaped cross-section with short members 10 which are provided for secure anchoring in the securing element 4.

Figure 2:
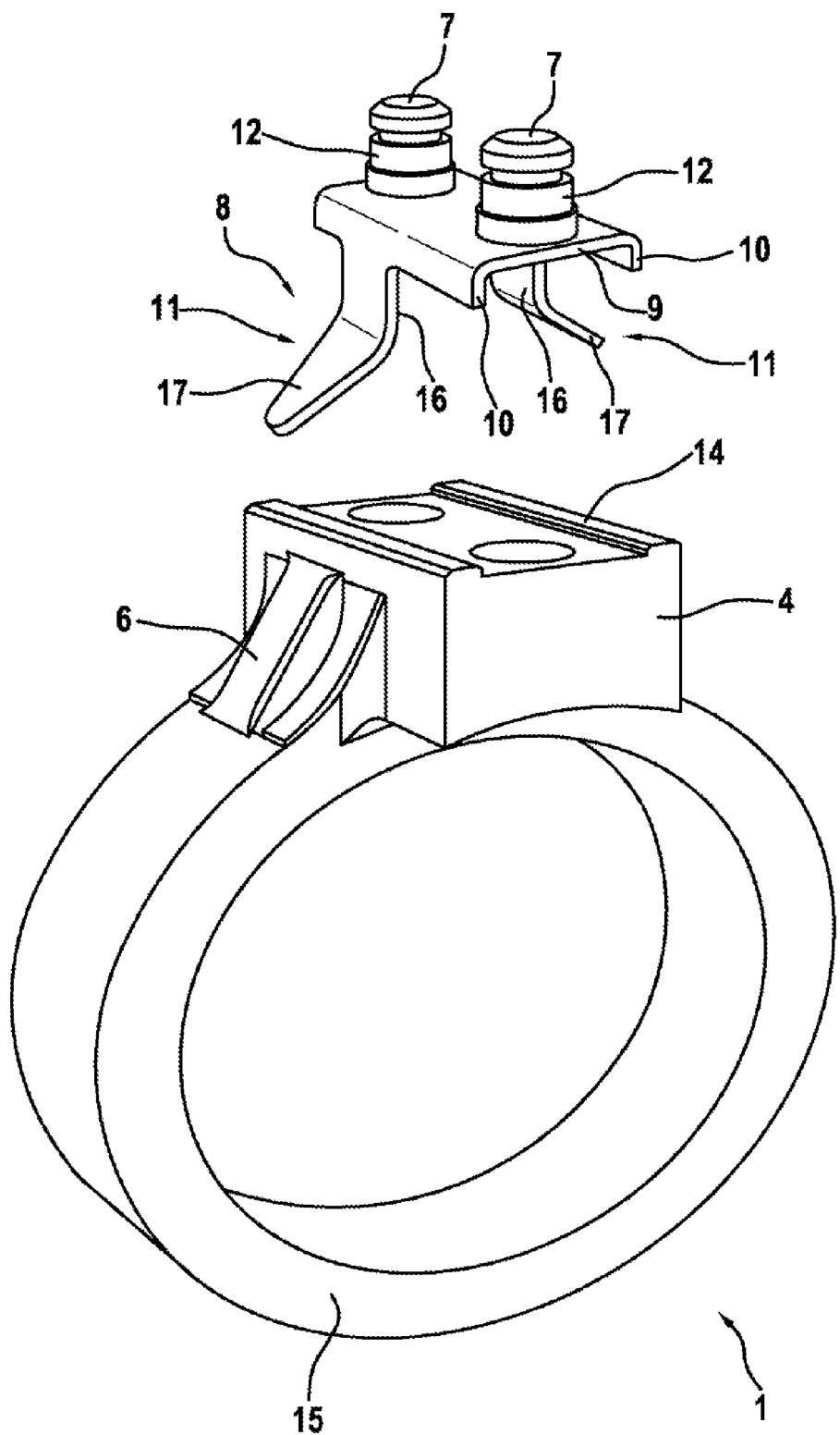
FIG. 2 is the same view of a retention member without any pump, with the additional illustration of a first variant according to the invention of an insertion member which is embedded in the retention member and which cannot be seen at that location.

A narrow wing 11 protrudes in an oblique manner from each member 10, in the first variant illustrated, the tips of the wings 11 extending in each case in an inclined manner, which again limits the covering of the insertion member 8 extended by the wings 11 to the required minimum level of rigidity. In the illustrated example, the wings 11 protrude in a first portion 16 parallel with the respective member 10 away from the central region 9. A second portion 17 of the wings 11 is angled in a lateral direction away from the plate 9. In the assembled state, the first portion 16 is arranged in the securing element 4 and the second portion 17 in the annular portion 15. Free ends of the wings 11 are constructed so as to be tapered in the direction of the ends. In the embodiment of FIG. 2, the width of the wings is in the region of from 20% to 50% of the width of the members 10. The width of the wings may also be smaller or greater. The insertion member 8 further has in the plate-like central region 9 thereof two holes and two bushes 12 for the connection pins 7.

Depending on the selected embodiment, it is possible to dispense with the angled members 10 and the wings 11 protrude directly from the central region 9.

In addition to the material, the cross-section and the length of the wings 11 of the insertion member 8 have a significant influence on the bending or torsion resistance. A determining factor for the wing length is the damping of the elastomer retention member required for the function of the pump 2. Generally: the more rigid the elastomer retention member is, the smaller the damping action thereof is. The rigidity is configured in such a manner that the assembly of the pump 2 in the elastomer retention member is enabled without drastic deformation of the insertion member 8. A permanent deformation of the insertion member 8 when the pump is assembled could lead to impairment of the press-fitting connection between the pump and elastomer retention member and consequently to the pump 2 being fitted in the elastomer retention member with excess play.

Figure 3:
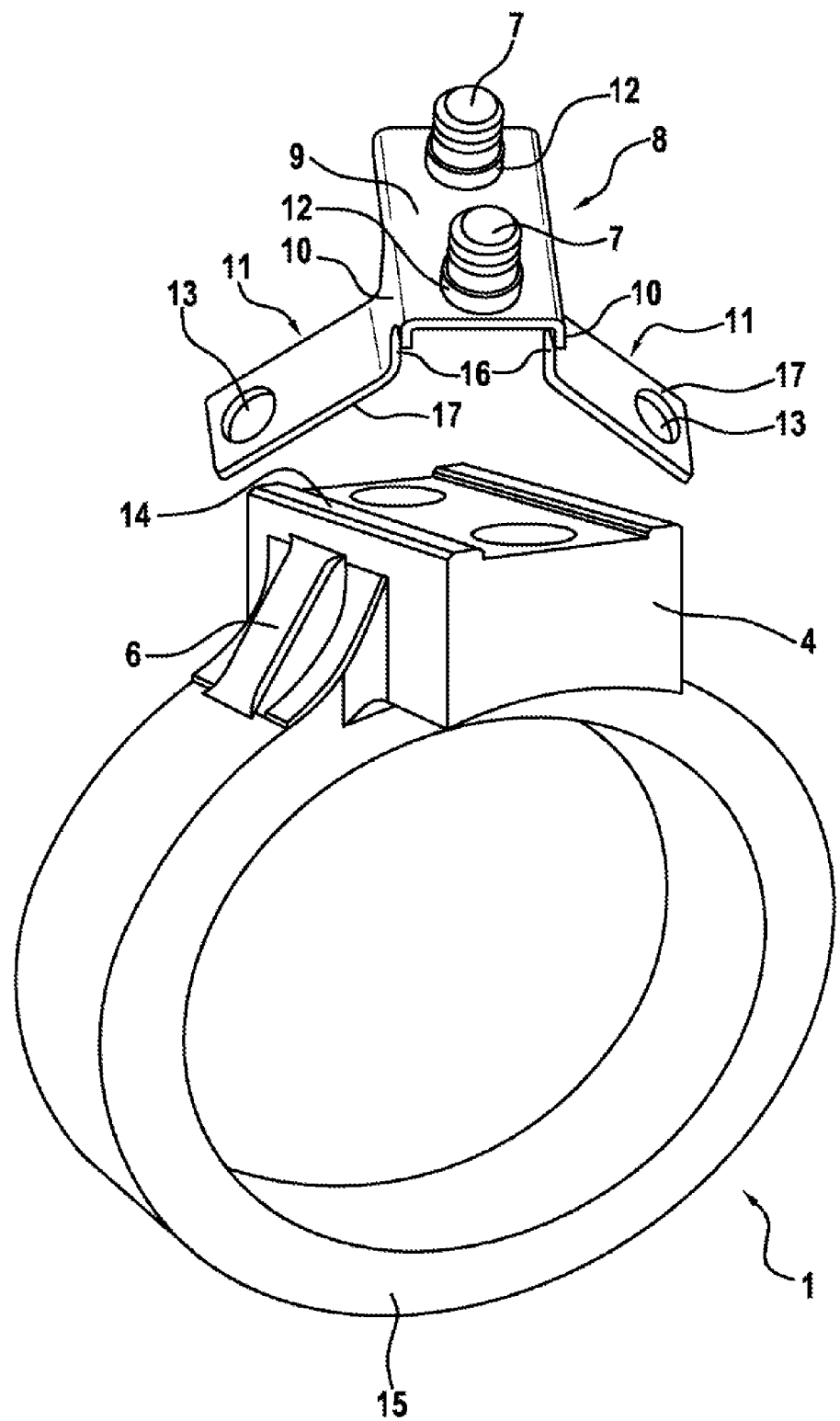
FIG. 3 is the same illustration of a retention member having a second variant according to the invention of an insertion member.

FIG. 3 shows, above the damping element 1, another embodiment of the insertion member 8—in which the wings 11 are formed in a rectangular manner and each have in the end region thereof a hole 13 having a circular cross-section. These holes 13 serve to reduce the shearing stress at the interface of the insertion member 8/damping element 1 and consequently—by means of a positive-locking connection—to increase the bonding between the two components. In the assembled state, the insertion member is embedded in the damping element 1, the first portions 16 of the wings 11 being embedded in the securing element 4 and the second portions 17 of the wings 11 in the annular portion 15. The width of the wings 11 is 80% of the width of the members 10. The width of the wings may also be greater or smaller.

Figure 4:
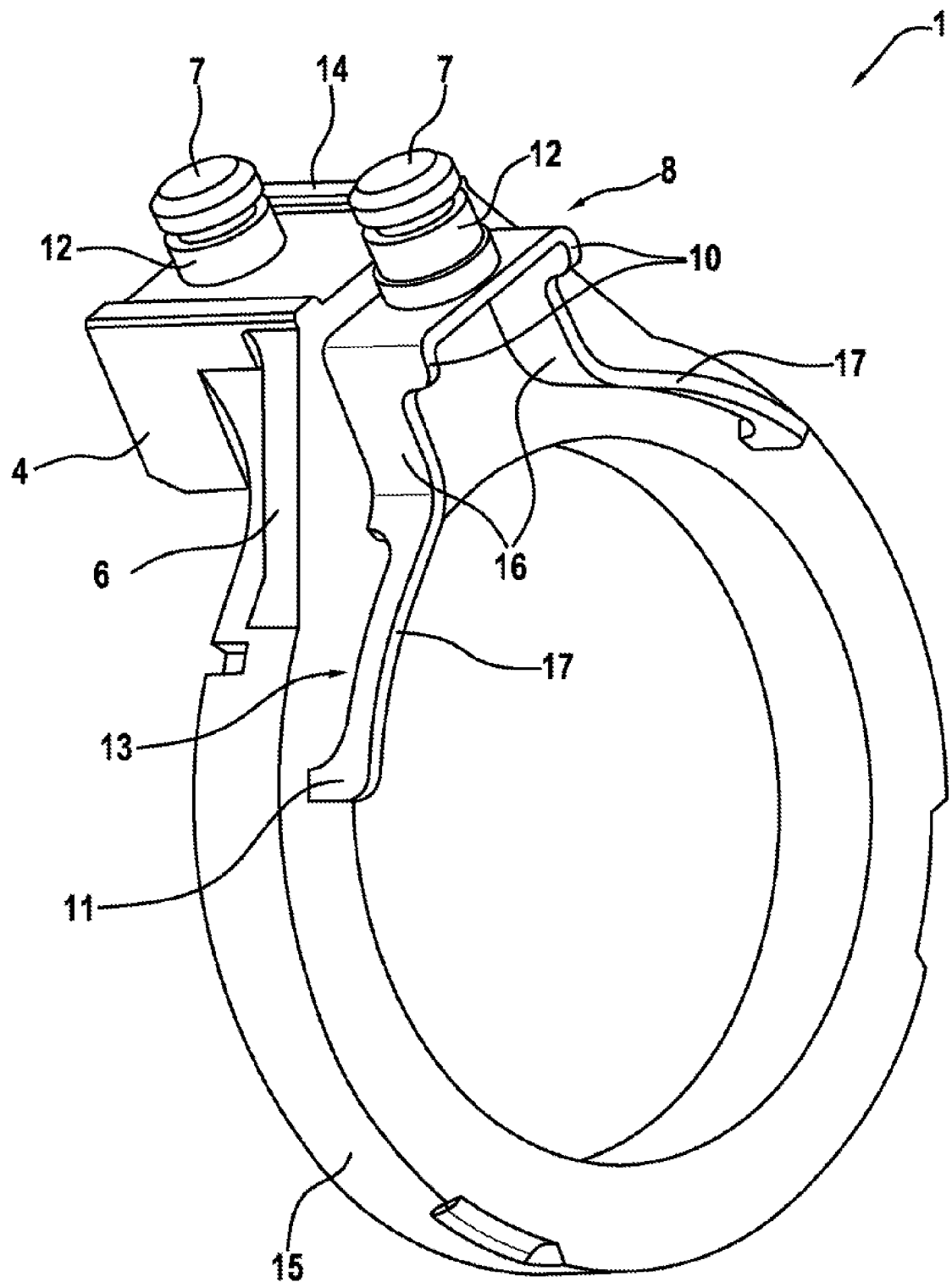
FIG. 4 is a perspective, broken-away view of a retention member having an insertion member which is embedded therein and which can partially be seen.

FIG. 4 is a perspective partial cross-section of another embodiment of the insertion member 8 in the assembled state with a damping element 1 which is illustrated in a state divided in half. This embodiment of the insertion member substantially corresponds to the embodiment of FIG. 3, but with the holes 13 being constructed as elongate holes which are orientated parallel with the longitudinal axis of the second portions 17. An improved positive-locking connection is thereby achieved between the damping element 1 and the insertion member 8. In the illustration shown, the embedding of the first portion 16 in the securing element 4 and the embedding of the second portion 17 in the annular member can clearly be seen. The width of the wings 11 is in the region of 80% of the width of the members 10. The wings 11 may also be narrower or wider.

What is claimed is:

1. A retention member for securing a unit (2) to a motor vehicle, the retention member comprising an annular damping element (1) whose inner region is provided for receiving the unit (2), the damping element having at an outer side a securing element (4) whose upper side (14), which is directed radially away from a center of the damping element (1), is provided as a mounting interface (5) to the motor vehicle, the securing element (4) having arranged therein an insertion member (8) which is configured to locally reinforce the damping element (1), characterized in that the insertion member (8) has at each of two opposing edges (10) a wing (11) which is embedded in the damping element (1).

2. The retention member as claimed in claim 1, characterized in that the wings (11) are arranged approximately centrally at the edges (10) of the insertion member (8).

3. The retention member as claimed in claim 1, characterized in that a material, a cross-section and a length of the wings (11) are configured to locally reinforce the damping element (1).

4. The retention member as claimed in claim 1, characterized in that the insertion member (8) comprises metal.

5. The retention member as claimed in claim 1, characterized in that the damping element (1) comprises an elastomer material.

6. The retention member as claimed in claim 1, characterized in that the wings (11) each have a hole (13) for positive-locking connection to the damping element (1).

7. The retention member as claimed in claim 6, characterized in that each hole (13) is an elongate hole orientated in a direction of the wings (11).

8. The retention member as claimed in claim 1, characterized in that the insertion member (8) has at least one recess for a connection pin (7) which is anchored in the damping element (1) and which protrudes from an upper side (14) of the securing element (4).

9. The retention member as claimed in claim 1, characterized in that the insertion member (8) has a U-shaped cross-section having two angled members, wherein the two angled members protrude into the securing element (4), and wherein the wings (11) each protrude from a respective one of the angled members.

10. The retention member as claimed in claim 1, characterized in that the wings (11) extend as far as a location in an annular portion (15) of the damping element (1).

11. The retention member as claimed in claim 1, characterized in that the wings (11) are arranged approximately centrally at longitudinal sides of the insertion member (8).

12. The retention member as claimed in claim 1, characterized in that the damping element (1) comprises an elastomer material in which the insertion member (8) is embedded by means of vulcanization.

13. The retention member as claimed in claim 1, wherein the insertion member includes a central region generally plate-like in form.

* * * * *